US012666226B2

(12) United States Patent
Yi et al.

(10) Patent No.: US 12,666,226 B2
(45) Date of Patent: Jun. 23, 2026

(54) COOPERATION TECHNIQUES FOR LOW-POWER DEVICES

(71) Applicant: QUALCOMM Incorporated, San Diego, CA (US)

(72) Inventors: Fan Yi, Princeton, NJ (US); Umesh Phuyal, San Diego, CA (US); Alberto Rico Alvarino, San Diego, CA (US); Lorenzo Casaccia, Barcelona (ES)

(73) Assignee: QUALCOMM Incorporated, San Diego, CA (US)

( * ) Notice: Subject to any disclaimer, the term of this patent is extended or adjusted under 35 U.S.C. 154(b) by 461 days.

(21) Appl. No.: 17/664,395

(22) Filed: May 20, 2022

(65) Prior Publication Data

US 2023/0379664 A1 Nov. 23, 2023

(51) Int. Cl.

| | |
|---|---|
| *H04W 4/06* | (2009.01) |
| *H04L 67/104* | (2022.01) |
| *H04W 4/029* | (2018.01) |
| *H04W 4/08* | (2009.01) |

(52) U.S. Cl.
CPC ........... *H04W 4/06* (2013.01); *H04L 67/1051* (2013.01); *H04W 4/029* (2018.02)

(58) Field of Classification Search
CPC ......... H04W 4/029; H04W 4/06; H04W 4/08; H04W 4/80; H04W 52/0219; H04W 84/20; H04W 88/04; H04W 88/06; H04L 67/104
See application file for complete search history.

(56) References Cited

U.S. PATENT DOCUMENTS

| | | | | |
|---|---|---|---|---|
| 11,869,336 | B2 * | 1/2024 | Ökvist | G08B 25/001 |
| 12,035,222 | B2 * | 7/2024 | Crouthamel | H04W 48/10 |
| 12,424,108 | B2 * | 9/2025 | Wang | G08G 5/53 |
| 2012/0158820 | A1 | 6/2012 | Bai et al. | |
| 2014/0233458 | A1 * | 8/2014 | Georgescu | H04W 4/22 |
| | | | | 370/328 |
| 2014/0328241 | A1 | 11/2014 | Subramanian et al. | |
| 2016/0262191 | A1 * | 9/2016 | Flynn | H04W 76/10 |
| 2021/0243713 | A1 * | 8/2021 | Ellenbeck | H04W 56/002 |
| 2021/0297128 | A1 * | 9/2021 | Badic | H04B 7/0617 |
| 2022/0131803 | A1 | 4/2022 | Ko et al. | |
| 2022/0312273 | A1 * | 9/2022 | Müller | H04W 28/18 |
| 2022/0360838 | A1 * | 11/2022 | Dalal | H04N 21/43615 |
| 2023/0319549 | A1 * | 10/2023 | Dees | H04W 12/03 |
| | | | | 455/410 |

(Continued)

OTHER PUBLICATIONS

International Search Report and Written Opinion—PCT/US2023/021247—ISA/EPO—Aug. 11, 2023.

*Primary Examiner* — Khawar Iqbal
(74) *Attorney, Agent, or Firm* — Patterson + Sheridan, L.L.P.

(57) ABSTRACT

Certain aspects provide a method of wireless communications by a user equipment, such as a low-power user equipment. The method includes receiving, from one grouped user equipment of a first group of user equipments, an indication that the user equipment is a current group leader of the first group of user equipments; receiving, from one or more grouped user equipments of the first group of user equipments via a first wireless transceiver system, one or more data requests; and sending, to a network entity via a second wireless transceiver system, one or more data payloads associated with the one or more data requests.

27 Claims, 13 Drawing Sheets

(56)          References Cited

U.S. PATENT DOCUMENTS

2023/0319850 A1 *  10/2023  Selvanesan  ........... H04W 72/02
                                                           370/329
2024/0147370 A1 *   5/2024  Mahalingam  ..... H04W 52/0219
2024/0422841 A1 *  12/2024  Freda  ................... H04W 76/14

* cited by examiner

500

Network Entity

Low-Power Devices

506

502

504

550

Network Entity

Low-Power Devices

504B

506

502

508

504A

560

Network Entity

Low-Power Devices

504B

510

502

508

504A

700

900

COOPERATION TECHNIQUES FOR LOW-POWER DEVICES

BACKGROUND

Field of the Disclosure

Aspects of the present disclosure relate to wireless communications, and more particularly, to techniques for low-power devices to cooperate in wireless communications.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method of wireless communications by a user equipment. The method includes receiving, from one grouped user equipment of a first group of user equipments, an indication that the user equipment is a current group leader of the first group of user equipments; receiving, from one or more grouped user equipments of the first group of user equipments via a first wireless transceiver system, one or more data requests; and sending, to a network entity via a second wireless transceiver system, one or more data payloads associated with the one or more data requests.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
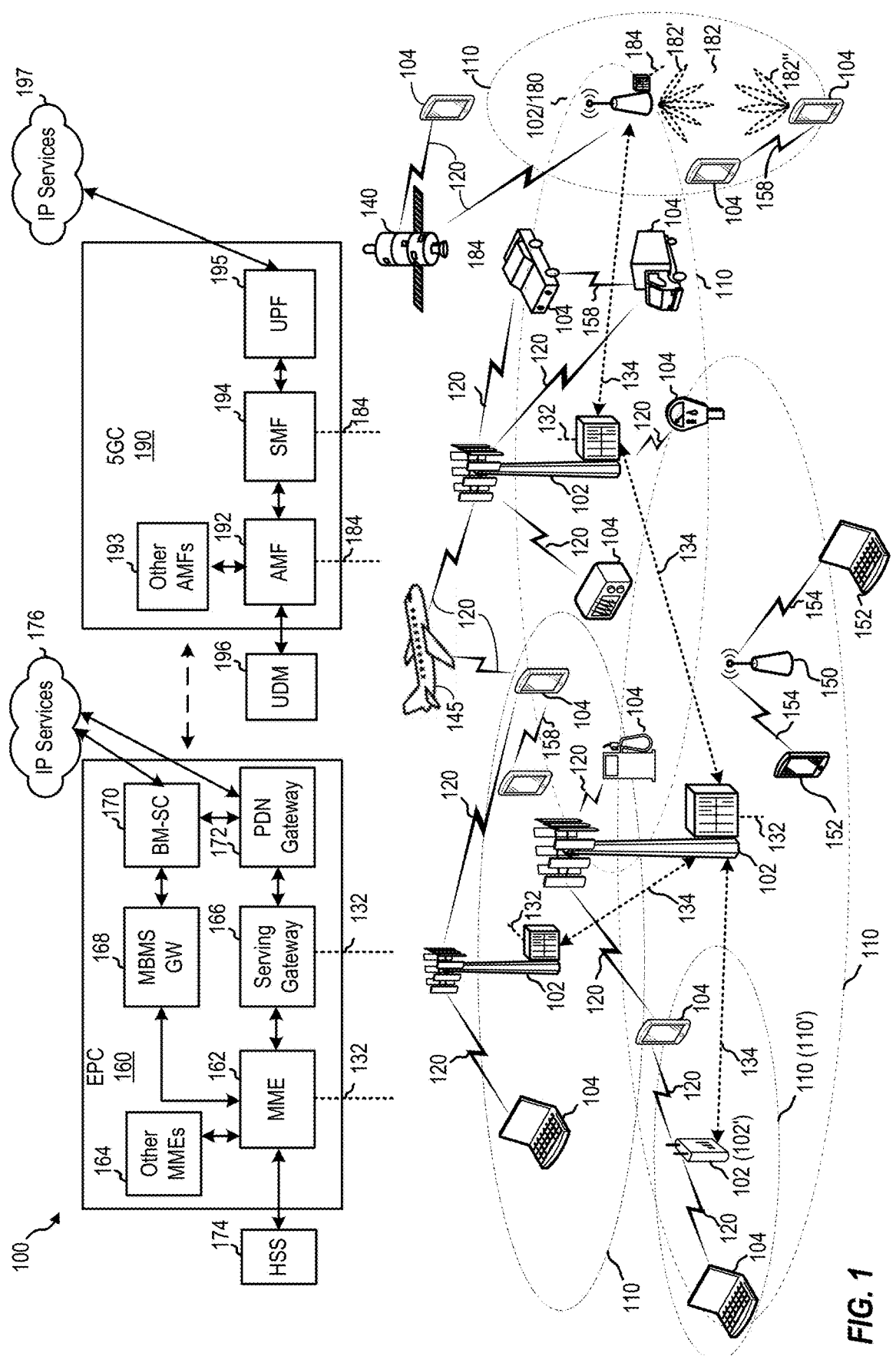
FIG. 1 depicts an example wireless communications network.

Aspects of the present disclosure provide apparatuses, methods, processing systems, and computer-readable mediums for cooperating in wireless communications among low-power devices.

Wireless communications have, generally speaking, revolutionized device capability across myriad technical domains. More recently, low-power wireless devices, such as Internet of things (IoT), always-on devices, sensors, edge processing devices, and the like, have become increasingly ubiquitous in many business sectors, including manufacturing, healthcare, logistics, and others. By some estimates, low-power devices, such as IoT devices, will soon account for 50 percent of all networked devices, and a significant portion will be wireless. And there are already billions of such devices deployed.

Low-power wireless devices are often battery-powered and may generally have one or more wireless transceiver systems. For example, a low-power wireless device may include a low-power, short-range transceiver system (e.g., BLUETOOTH®, ZIGBEE®, etc.) for participating in relatively short distance wireless networks, such as a personal area network (PAN) or wireless personal area network (WPAN) (generally referred to as a PAN herein). The reach of a PAN varies generally from a few centimeters to a few meters. PANs specifically tailored for low-power operation of sensors are sometimes also referred to as low-power personal area network (LPPAN).

A low-power wireless device may also have a high-power and long-range transceiver system (e.g., Wi-Fi, cellular (e.g., narrowband IoT), and the like) for participating in relatively long distance wireless networks, such as wide area networks (WANs). The reach of a WAN can generally be up to several kilometers. Notably, such high-power transceiver systems often expend significantly more energy in any given transmission compared to the low-power transceiver systems— often by several orders of magnitude.

While the capability and need exists for low-power wireless devices to communicate using multiple different wireless technologies (e.g., low- and high-power transceiver systems), an extant technical problem is that use of the high-power transceiver systems may significantly reduce device service life (e.g., by rapidly depleting onboard energy storage devices, such as batteries). Accordingly, it is desirable to manage communications for low-power wireless devices to extend service life, especially where low-power wireless devices are designed for long deployments and may not have easily serviceable parts, such as replaceable batteries.

Notably, low-power wireless devices are often deployed in relatively close proximity, such as devices within a smart-home, smart-office, manufacturing plant, medical facility, transport vehicle, or the like. The proximity of such devices gives rise to the opportunity to organize such devices (e.g., into groups) and to intelligently share the burden of longer range, higher power communications so that the performance of the group (e.g., the battery life of the devices in the group) is improved.

Accordingly, aspects described herein relate to techniques for low-power devices to cooperate in wireless communications. For example, low-power devices may utilize low-power transceiver systems to communicate over short ranges among the group and may select a single device in the group to perform a long-range communications using a high-power transceiver system. The device selected to perform the long-range communications may beneficially be changed during defined intervals so that the load is shared among the group of low-power wireless devices, and the overall performance of the group of low-power wireless devices (e.g., in terms of service life based on energy reserves) is maximized.

Further, a leader of a group of low-power wireless devices may perform other power-intensive operations on behalf of the rest of the group, such as high-power sensing operations (e.g., sensing location using a satellite-based positioning system).

Cooperation among low-power wireless devices beneficially improves overall power efficiency for each cooperating device, such as by reducing the power (and network) overhead of enabling a transceiver system (e.g. a modem), establishing a connection with a network entity associated with a WAN, and transmitting and/or receiving data from the network entity. For example, a group of low-power wireless devices may pool packets for transmission using a low-power transceiver system for PAN communications and then select a group "leader" to transmit the pooled packets to a WAN using a high-power transceiver system.

Accordingly, aspects described herein provide a technical solution to the aforementioned problems associated with low-power wireless devices needing to use low- and high-power transceiver systems for their given application (e.g., IoT sensors deployed in facility).

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
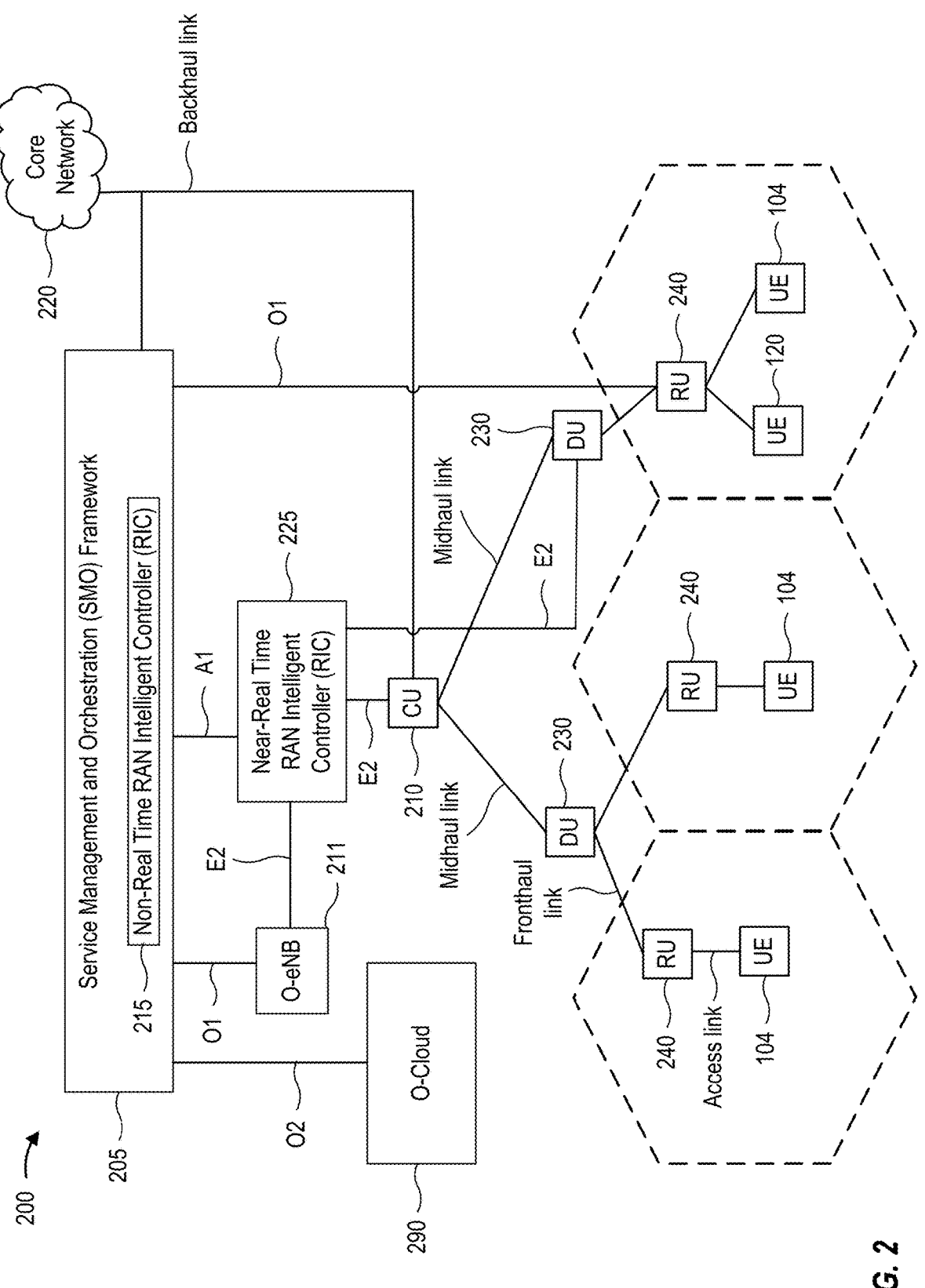
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT MC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
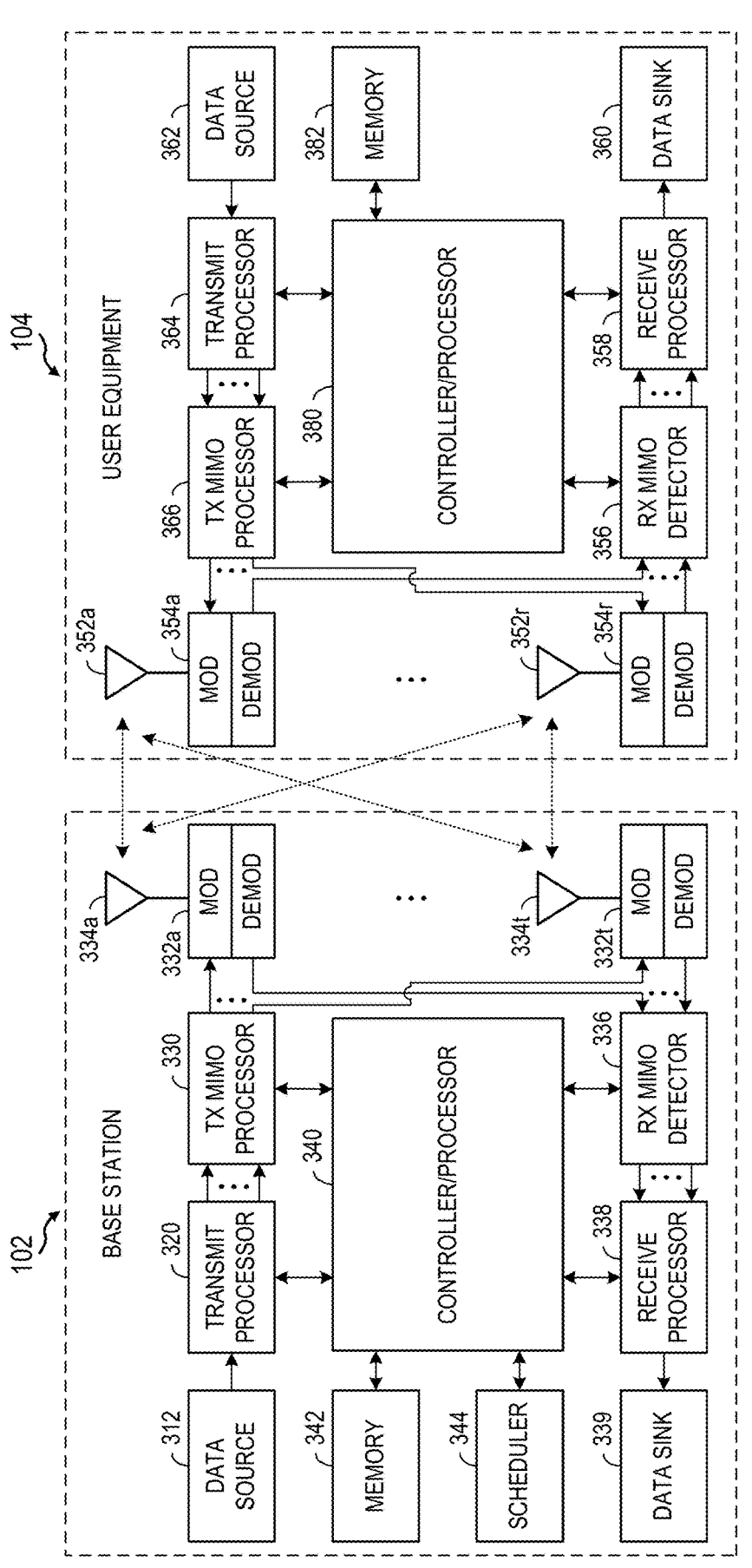
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a-332t*. Each modulator in transceivers 332*a-332t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a-332t* may be transmitted via the antennas 334*a-334t*, respectively.

In order to receive the downlink transmission, UE 104 includes antennas 352*a-352r* that may receive the downlink signals from the BS 102 and may provide received signals to the demodulators (DEMODs) in transceivers 354*a-354r*, respectively. Each demodulator in transceivers 354*a-354r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a-354r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a-354r* (e.g., for SC-FDM), and transmitted to BS 102.

At BS 102, the uplink signals from UE 104 may be received by antennas 334*a-t*, processed by the demodulators in transceivers 332*a-332t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
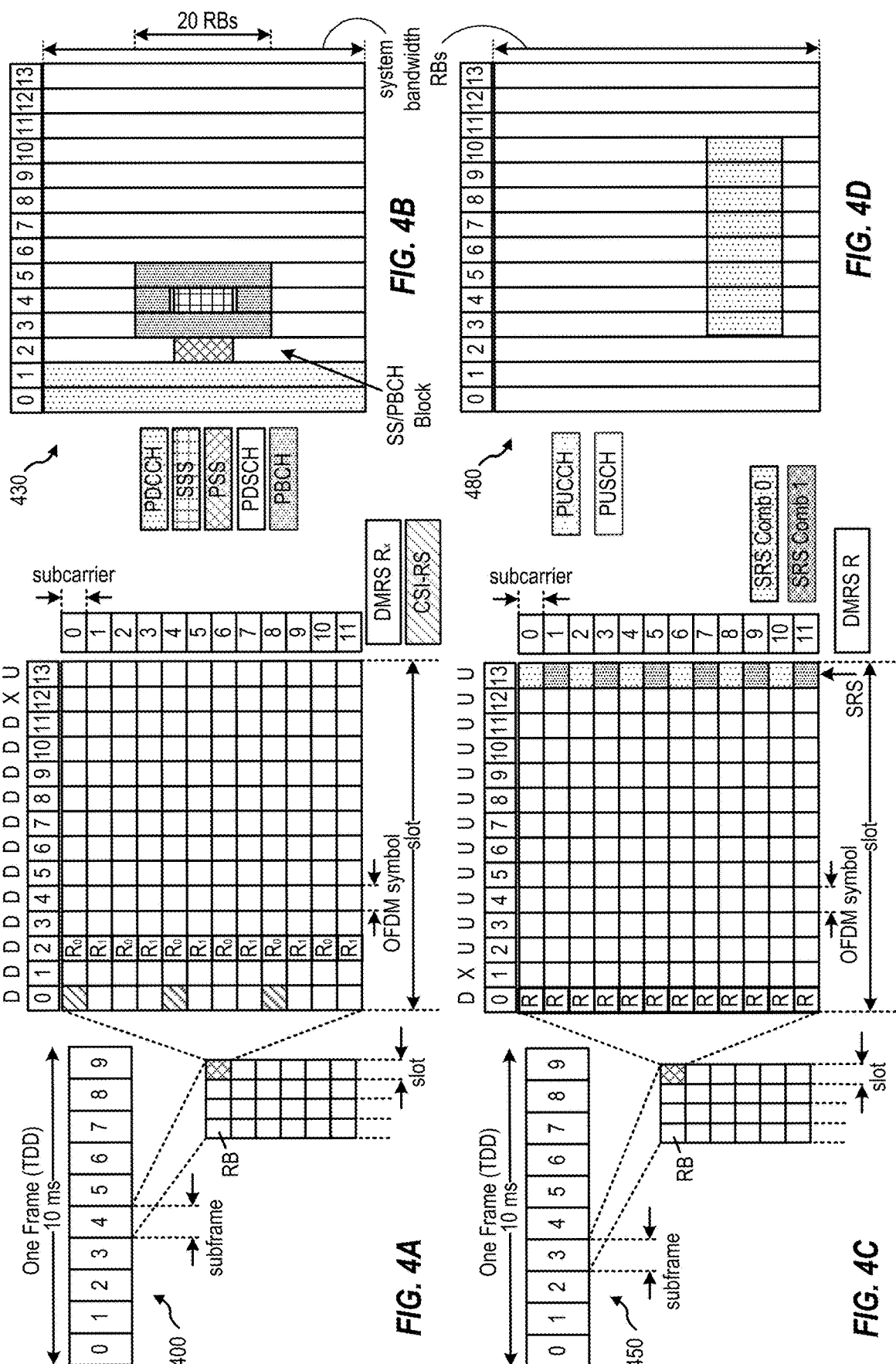
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu$=0 has a subcarrier spacing of 15 kHz and the numerology $\mu$=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu$=2 with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Cooperation Techniques for Low Power Devices

Aspects described herein relate to techniques for user equipments (e.g., low-power user equipments, such as IoT devices) to cooperate in wireless communications. As described in further detail below, in various aspects, a plurality of user equipments may form a group and then elect a leader of the group for performing grouped (or common) operations, such as communications of multiple user equipment's data using a single device's high-power communication's capability and/or performing another high-power operation (e.g., position location using a satellite-based positioning system) that is relevant to multiple devices. At defined intervals, the leader of the group may be changed based on current conditions of user equipments in a group in order to distribute the load of grouped operations among the user equipments in the group. Further, user equipments may join a group or be selected to lead a group based on various factors, such as proximity, state of charge, channel characteristics between the user equipments and a network entity, channel characteristics between the user equipments in a group, and the like. As above, these aspects allow for improving the performance of the user equipments, such as lengthening service life (e.g., longer battery life) and reducing network overhead on high-power communications links, to name a few technical benefits.

Figure 5A:
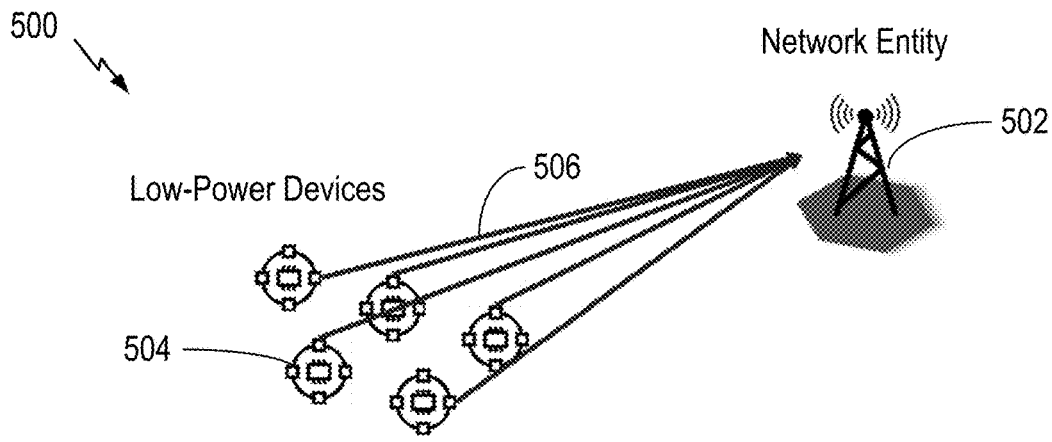
FIG. 5A depicts an example of a plurality of user equipments acting independently with respect to communications with a network entity.

FIG. 5A depicts an example of a plurality of user equipments (e.g., 504) acting independently with respect to communications with a network entity 502 (e.g., a base station, such as described above with respect to FIGS. 1-3). User equipments, such as 504, may generally be examples of user equipments, as described above with respect to FIGS. 1 and 3, and more specifically, may be low-power user equipments such as IoT devices.

As can be seen in example 500, without cooperation, each user equipment makes a high-power communication (e.g., 506) between itself and network entity 502 (e.g., an uplink communication), despite being in close proximity to other user equipments performing the same or similar operations. In this example, high-power communication 506 is an example of a wide area network (WAN) communication that may be performed by a high-power transceiver system, such as a narrowband internet of things (NB-IoT) transceiver system; a new radio (NR) reduced capability (RedCap) transceiver system; a NR superlight transceiver system; a NR superlight sidelink transceiver system; an eMTC transceiver system; a 2G transceiver system like GPRS or EDGE, an unlicensed transceiver system like WiMax, and others.

Figure 5B:
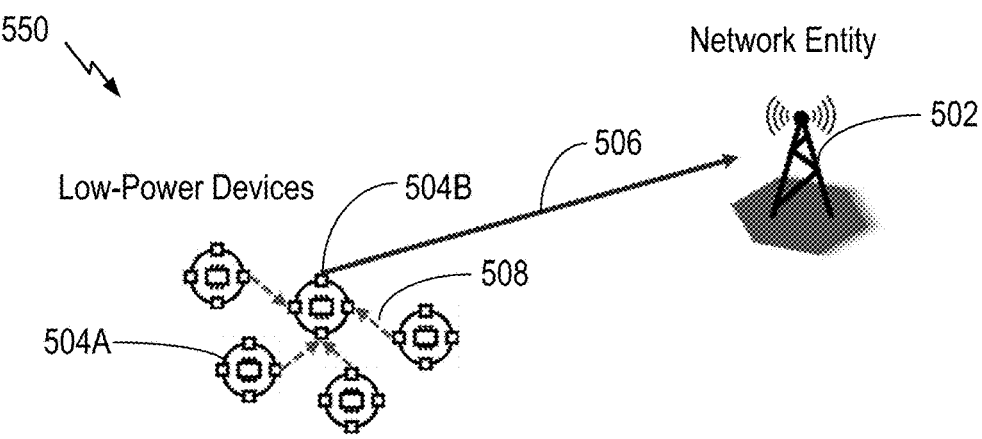
FIG. 5B depicts an example of a plurality of user equipments acting cooperatively with respect to communications with a network entity.

FIG. 5B, on the other hand, depicts an example 550 of a plurality of user equipments formed into a group and cooperating in uplink communications with network entity 502. In particular, each of the user equipments (e.g., 504A) transmits a data request to a leader of the group (user equipment 504B in this example) over a PAN, e.g., using a low-power transceiver system, and then the group leader 504B makes a single high-power transmission 506 to network entity 502 based on the data requests. The data request may include, for example, packets of data to be sent to network entity 502 via relay through group leader 504B, a request for group leader 504B to retrieve data from network entity 502, or a request for group leader 504B to perform some local operation to generate data on behalf of one or more of the grouped user equipments, such as a local sensing operation. High-power communication 506 may thus include a payload based on the data requests. The low-power transceiver system could be, for example, a BLUETOOTH® transceiver system, a ZIGBEE® transceiver system, a Z-WAVE® transceiver system, other 802.15.4 and 802.15.5 systems, or the like.

As above, in addition to performing communications with network entity 502, group leader 504B can also perform non-communication operations on behalf of the other grouped user equipments (e.g., 504A), such as a local sensing operation (e.g., using a sensor), a location detection (e.g., using a satellite-based location system such as GPS or GLONASS), an image, sound, or video capture, or the like. In some cases, data generated by the non-communication operation may be shared among the grouped user equipments via low-power communications (e.g., 508) and/or included in data sent to network entity 502 via high-power communication 506. For example, a location sensed by a GPS system of the group leader 504B may be provided to network entity 502 and to other members of the group, which may use the location data for local purposes.

Notably, as compared to example 500 of FIG. 5A, in example 550 of FIG. 5B, only one user equipment, group leader 504B, sends a high-power communication 506 to network entity 502, as opposed to each of the user equipments doing the same in example 500. Because low-power communications (e.g., 508) may be significantly less costly in terms of power use, such as by several orders of magnitude, the net power use of the group of user equipments in example 550 is generally significantly less than that of example 500 while accomplishing the same task. For example, it takes significantly less power for each grouped user equipment (e.g., 504A) to send data to group leader 504B for transmission to network entity 502, as in example 550, than for each user equipment to send the same data to network entity 502 directly, as in example 500.

Figure 5C:
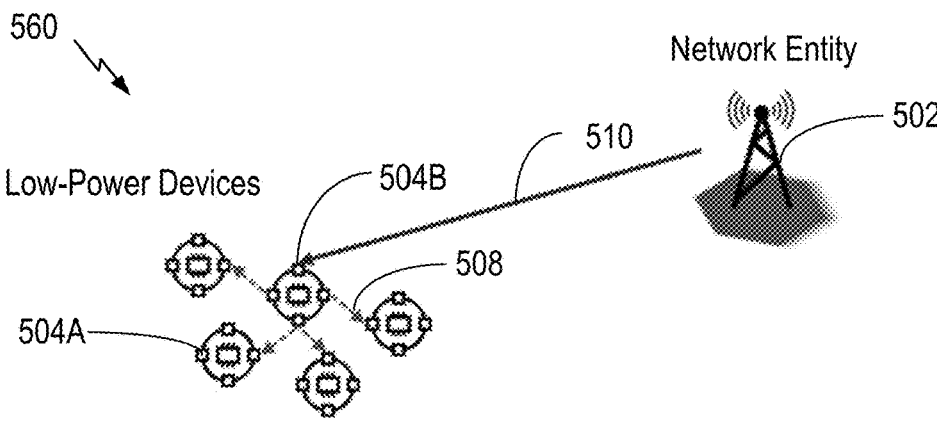
FIG. 5C depicts another example of a plurality of user equipments acting cooperatively with respect to communications with a network entity.

FIG. 5C depicts another example 560 of a plurality of user equipments formed into a group and cooperating in downlink communications with network entity 502. In particular, In this example, the group leader 504B receives a single high-power transmission 510 from network entity 502, which may be in response to the transmission 506 made in FIG. 5B. The high-power transmission may include, for example, one or more downlink data payloads, which may comprise data for one or more of the grouped user equipments, including or excluding the group leader 504B. In some cases, the downlink data payloads may include identifiers that group leader 504B may use to determine to which grouped user equipment to forward one or more of the downlink data payloads.

After receiving the transmission 510, group leader 504B then transmits to each of the other grouped user equipments (e.g., 504A) relevant data over a PAN, e.g., using the low-power transceiver system to make a low-power transmission (e.g., 508). Note that while this example shows group leader 504B transmitting to all of the other grouped low-power user equipments, in other examples, group leader 504B may transmit only to a subset of the grouped user equipments (e.g., 504A) depending on the contents of the data received from network entity 502.

Figure 6:
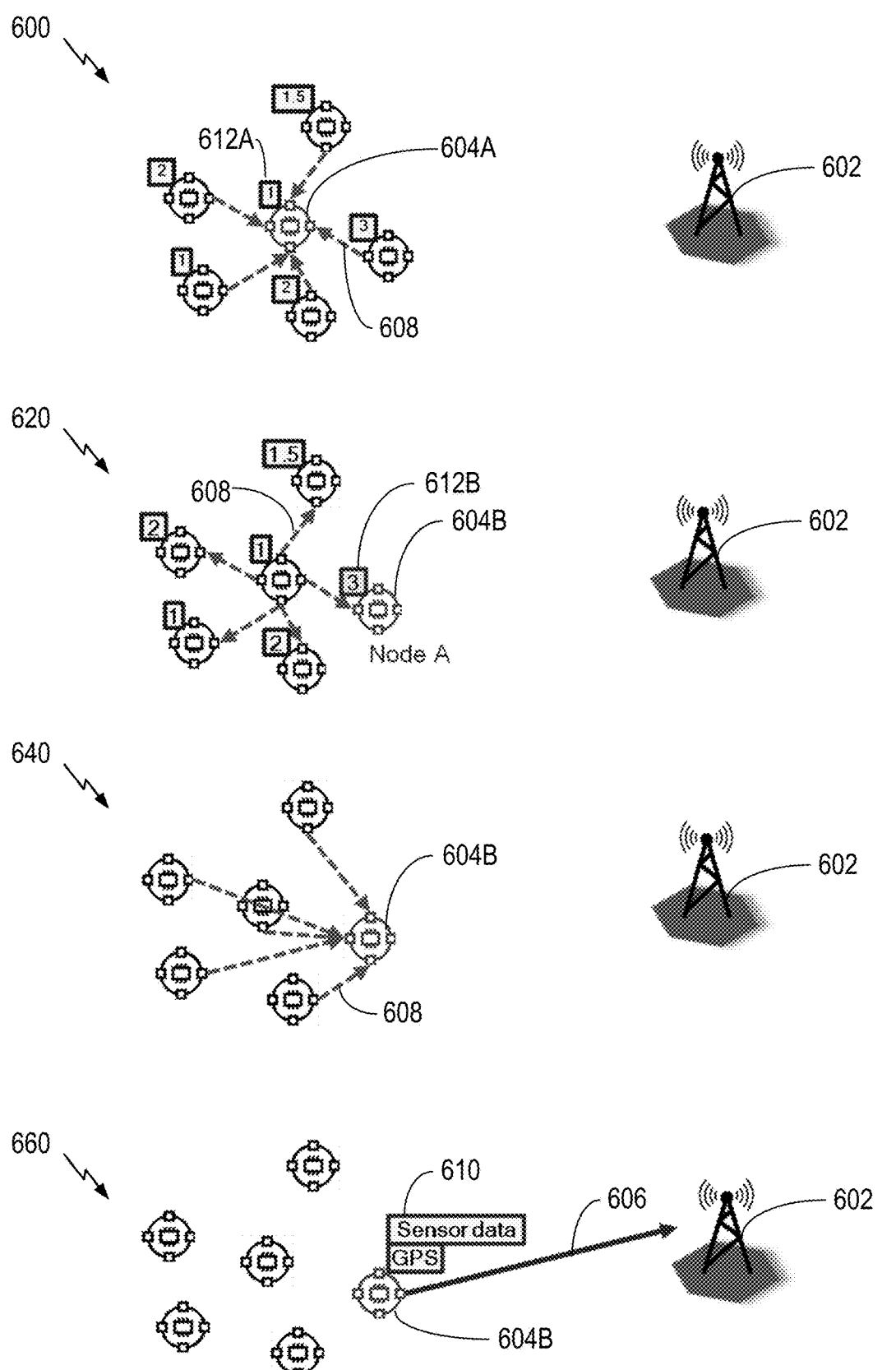
FIG. 6 depicts an example process for choosing a group leader and then utilizing the group leader for a group operation.

FIG. 6 depicts an example process 600 for choosing a group leader and then utilizing the group leader for a group operation.

In order to choose a group leader, various factors may be considered. Generally, within any group, load balancing and channel conditions are examples of considerations for group leader selection. Thus, factors for determining a group leader selection score may include: current state of charge of an energy storage device (e.g., battery) for each user equipment; a channel state metric for each user equipment (e.g., a received signal strength indicator (RSSI), downlink received signal received power (RSRP), signal-to-noise ratio (SNR), and the like); a remaining target service life; an expected energy cost for performing a group operation (such as a high-power communication or other non-communication operation); and others. In some aspects, these and other factors may be weighted (e.g., using weight parameters) to generate the group leader selection score (e.g., the group leader selection score may be generated as a composite of a plurality of weighted factors).

In an example where the highest group leader selection score in a group of user equipments becomes the next leader of the group, a higher state of charge may generally increase the group leader selection score because more stored power means more ability to make high-power communications or to perform other high-power operations (e.g., location sensing). Similarly, a better channel state metric may generally increase the group leader selection score because better channel state means a better likelihood of a successful transmission and avoided retransmission. As another example, a shorter remaining target service life may generally increase the group leader selection score, provided it also has sufficient energy remaining, because the device has less time to participate in the load balancing to benefit the group. For example, a package tracking device in a package nearing its destination (or its estimated time of arrival) that still has substantial energy stores (e.g., battery charge) may help other package tracking devices in proximity (e.g., all within the same transport vehicle) prior to its delivery and disconnection from the group due to lack of ongoing proximity.

Accordingly, at time 600, each of the user equipments (e.g., 604A) determines its own group leader selection score (e.g., 612A) and sends it to the current group leader 604A by way of low-power communication 608 (e.g., using a low-power transceiver system, such as those described above). In some aspects, the non-group leader user equipments in a group may be referred to as "follower devices" or "follower user equipments."

Then at time 620, the current group leader 604A determines the highest score among the group, and notifies the user equipment with the highest score (604B in this example) that it will be the next group leader. The current group leader 604A also notifies all of the other user equipments in the group who the next (new) group leader is via low-power communication (e.g., 608). For example, the next group leader may be identified by an identification number, index, or other indication.

In some cases, more than one user equipment in the group may have the same high group leader selection score. In such cases, the next group leader may be selected randomly, or by some other heuristic, from those low-power devices having the same high group leader selection score.

Then at time 640, one or more of the follower user equipments in the group sends a data request to the now-current group leader 604B via low-power communication (e.g., 608). In the depicted example, all of the follower user equipments send a request to current group leader 604B, but this need not be the case, and requests may be sent on an as-needed basis. In some cases, the data requests may be sent during preconfigured opportunities, such as given time slots, or based on a synchronized count-down timer, or the like.

Though not depicted in FIG. 6, in some aspects, follower user equipments may send both their data request (e.g., packets to be sent to network entity 602 by the leader user equipment) along with a group leader selection score for the next leader in a single transmission.

At time 660, the current group leader 604B performs a group operation (or operations) based on the received data requests. In this example, group leader 604B performs a sensing operation to generate GPS data indicating a location for the group of user equipments (e.g., a group of packages in a delivery vehicle) and sends that data via high-power communication 606 to network entity 602. For example, the data sent to network entity 602 may be used by a downstream process for tracking a group of objects (e.g., packages) associated with the user equipments in the group.

During the various steps depicted in FIG. 6, each of the user equipments may maintain various state data, such as an operational state of the user equipment; a group identifier; a group leader identifier; a list of all grouped user equipments in a group associated with the group identifier; a state of charge of a power storage device (or devices) in the user equipment; a channel state metric associated with a channel between the user equipment and the network entity (e.g., 602); a channel state metric associated with a channel between the user equipment another user equipment in the group, and a remaining target service life of the user equipment (e.g., based on location or time). These are just some examples, and others are possible.

Though not depicted in FIG. 6, after the operations depicted at time 660, each of the user equipments in the group may update its operational state. Operational state may be based on various state information, such as state of charge of the power storage device (e.g., battery) in the user equipment.

Figure 7:
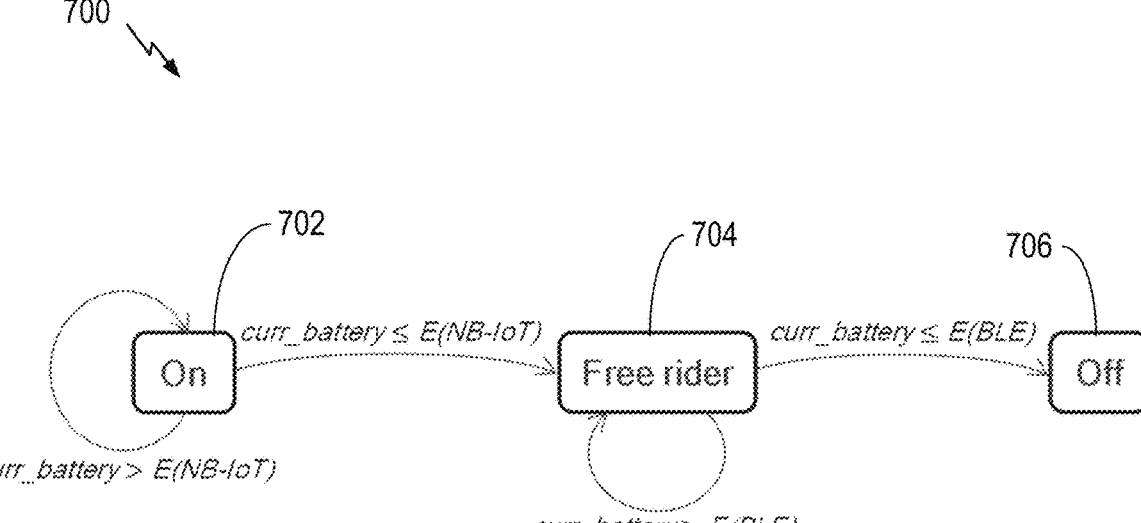
FIG. 7 depicts an example of an operational state transition diagram for a user equipment.

FIG. 7 depicts an example 700 of an operational state transition diagram for a user equipment, such a low-power user equipment.

In this example, a user equipment may initially be in an "on" state 702 in which the user equipment is able to perform high-power communications (e.g., using a high-power transceiver system) and low-power communications (e.g., using a low-power transceiver system). Thus, a user equipment in the on state 702 may generally be a group leader or a follower in a group. In this example, narrowband IoT (NB-IoT) is used as an example of a high-power transceiver system and BLUETOOTH® low energy (BLE) is used as an example of a low-power transceiver system; however, other types of transceiver systems may be used in other examples.

To determine whether to move from the on state 702 to the "free rider" state 704 after some interval, the user equipment may test whether its current state of charge (e.g., in an onboard battery) is greater than an expected energy budget (or cost) for a high-power communications (e.g., an NB-IoT communication in this example). If the current state of charge is greater than the expected energy budget of the high-power communication, e.g., "curr_battery>E(NB-IoT)" in FIG. 7, then the user equipment stays in the "on state" 702. If, on the other hand, the current battery state of charge is less than or equal to the expected energy budget of the high-power communication, e.g., "curr_battery≤E(NB-IoT)" in FIG. 7, then the user equipment transitions to the free rider state 704.

In the free rider state 704, a user equipment may generally only be a follower in a group. So, for example, the user equipment in free rider state 704 may send data requests to a leader of its group, but may not itself become the leader of that group due to its inability to perform the high-power communication on behalf of itself and other group members based on its state of charge.

To determine whether to move from the free rider state 704 to the "off" state 706 after some interval, the user equipment may test whether its current state of charge is greater than an expected energy budget for a low-power communications (e.g., BLE communication in this example). If the current state of charge is greater than the expected energy budget of the low-power communication, e.g., "curr_battery>E(BLE)" in FIG. 7, then the user equipment stays in the free rider state 704. If, on the other hand, the current state of charge is less than or equal to the expected energy budget of the low-power communication, e.g., "curr_battery≤E(BLE)" in FIG. 7, then the user equipment transitions to the off state 706.

In some cases, the interval between state transition considerations may be defined based on: an amount of time that has passed; an amount of communications that have been performed by the user equipment; after the user equipment has served as a group leader; after an amount of data is transmitted by the user equipment; after a number of group leader operation cycles (e.g., group leader high-power communications); and other factors.

Figure 11:
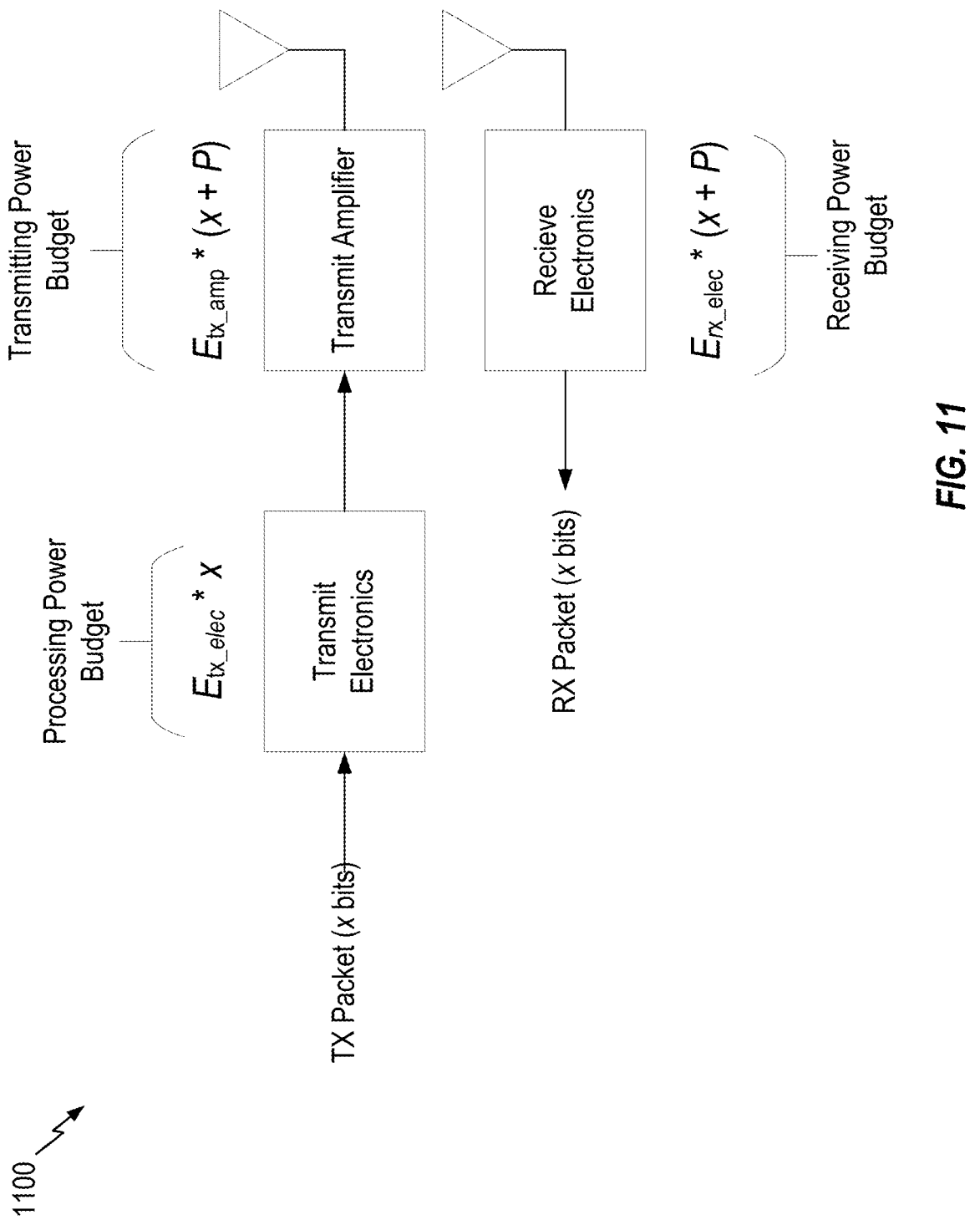
FIG. 11 depicts an example of a first order radio model for determining expected power costs for transmitting and receiving data.

Note that while NB-IoT and BLE are used as examples of high- and low-power transceiver systems/communications in this example, other types of relatively higher and relatively lower power transceiver systems/communications can likewise be used to implement state transition rules based on expected energy budgets for transmissions using those systems. FIG. 11, described further below, depicts one example of a method for determining expected energy budgets for transmitting and receiving using a given type of transceiver system.

Figure 8:
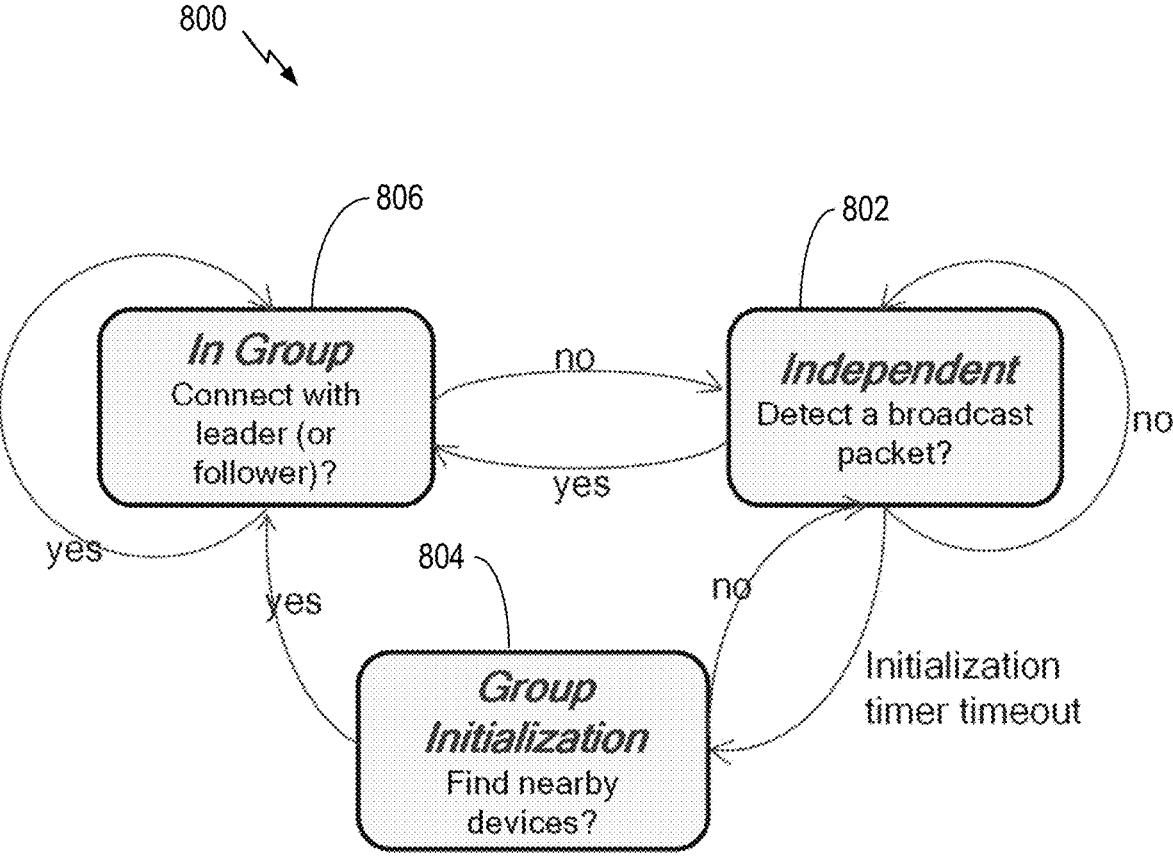
FIG. 8 depicts an example of a state transition diagram for group initialization for a user equipment.

FIG. 8 depicts an example 800 of a state transition diagram for group initialization for a user equipment, such a low-power user equipment.

A user equipment may start off in an independent state 802 in which it is not a part of a group. While in the independent state, the user equipment may be in a low power state and "wake up" periodically (e.g., at a set time interval) to check for broadcasts by nearby groups of user equipments (e.g., low-power user equipments). If the user equipment detects a nearby group broadcasting messages, it may then try to join the group by connecting with the leader and entering state 806. In some aspects, a "nearby" group could be determined based on signal strength, but not necessarily physical proximity. For example, two devices ~10 m apart may be nearby for BLUETOOTH® if they are in direct line of sight, but may be too far away in terms of signal strength if they are on opposite sides of a dense structure (e.g., a concrete wall) while nevertheless being physically close to each other.

If the user equipment detects no nearby group broadcasts, it may then check if a group initialization timer has expired. If the group initialization timer has expired, then the user equipment may transition to the group initialization state 804 and broadcast a group initialization message to find nearby user equipments.

If devices are found, then the user equipment may send data for forming a group, such as a group ID, a list of detected nearby user equipments, and the like. User equipment then transitions to the group state 806. Once in the group state 806, a leader may be chosen as described above, e.g., with respect to FIG. 6.

If devices are not found, then the user equipment may return from group initialization state 804 to independent state 802 and resets the group initialization timer.

While in the group state 806, if the other group members all leave the group (e.g., because of proximity loss or change in operational state), or if the user equipment changes operational state (such as to the "off" state described with respect to FIG. 7) such that it cannot stay in the group, then the user equipment returns from the group state 806 to the independent state 802 and resets the group initialization timer if not in the "off" state.

Figure 9A:
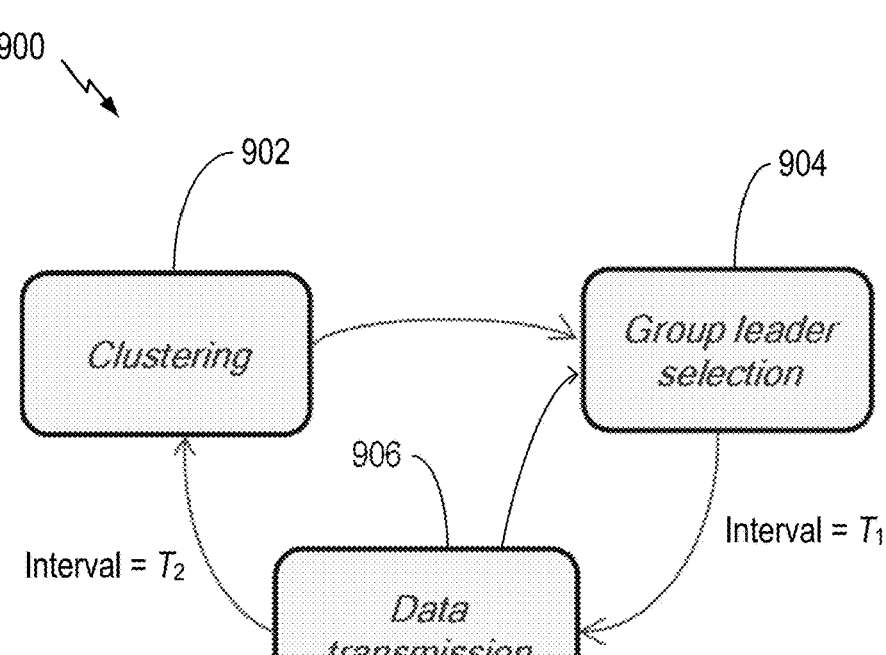
FIG. 9A depicts an example of a state transition diagram for cooperation among multiple groups of user equipments.

FIG. 9A depicts an example 900 of a state transition diagram for cooperation among multiple groups of user equipments, such a low-power user equipments.

As described above, various user equipment deployments may include mobile user equipments, such as those used as tracking devices. Accordingly, from time to time user equipments in one group may move to another group, as described with respect to FIG. 8, and more generally, groups may be reformed at a system level, as now described with respect to FIGS. 9A and 9B.

Figure 9B:
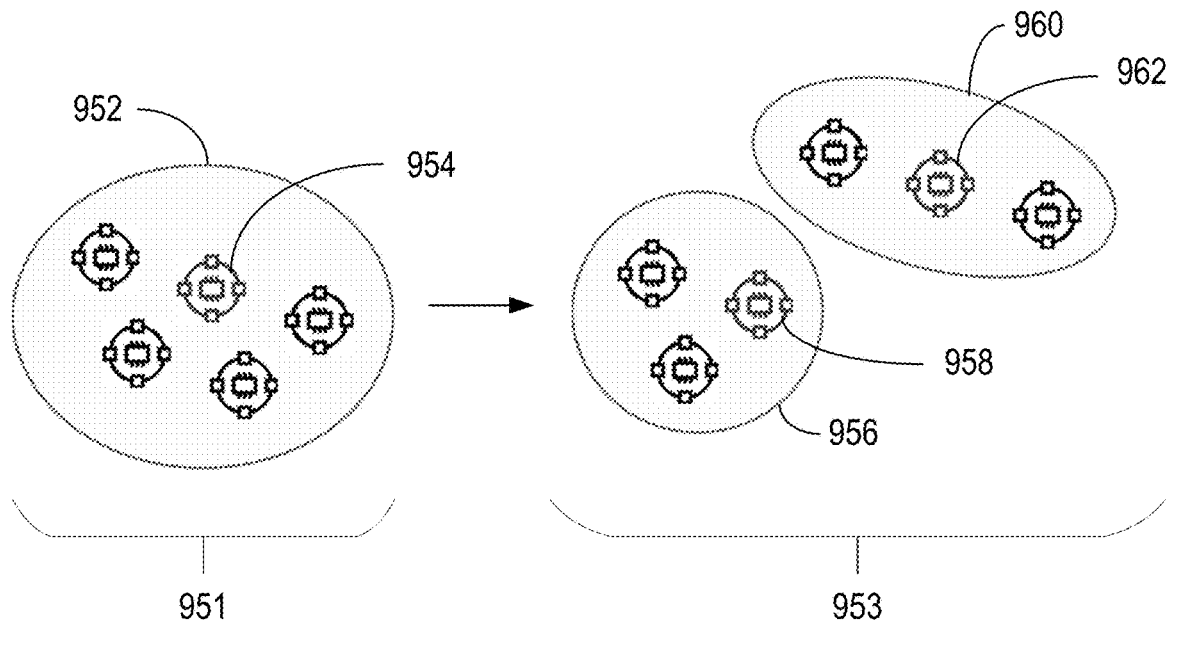
FIG. 9B depicts an example of user equipments transitioning between groups.

As depicted in FIG. 9A, a set of user equipments (e.g., low-power user equipments) may initially participate in a clustering process at state 902 to form one or more initial groups, such as group 952 depicted in FIG. 9B.

Thereafter, at state 904, a group leader may be selected for the one or more initial groups, such as described above with respect to FIG. 6. For example, in FIG. 9B, user equipment 954 may be selected as the leader for group 952, and all other user equipments in group 952 may be designated as followers in the group 952. In this example, the initial set of groups 951 includes only group 952.

Once the initial groups are formed at state 902, and group leaders are selected at state 904, the groups may transition to state 906 for performing group operations, such as a high-power communications as described above with respect to FIGS. 5 and 6. In this example, a data transmission may be initiated based on an interval $T_1$ (e.g., as measured by a timer), such as a set number of seconds, minutes, or the like. Note that while data transmission is used in this example, as described above, a group leader may likewise perform other operations on behalf of the group, such as sensing operations.

Generally, groups of user equipments may alternate between states 904 and 906 during a second interval $T_2$ (e.g., as measured by another timer), such as a set number of hours, days, or the like. In some aspects, $T_2$ may generally be longer than $T_1$ based on factors, such as deployment, mobility, etc. Further, where individual user equipments are highly mobile, the second interval $T_2$ may be shortened, and conversely, where individual user equipments are deployed in generally static locations, $T_2$ may be lengthened. Note that even in the case of static deployments, channel state and other environmental factors, such as other mobile or new objects in an environment, may give rise to a need to continue re-clustering user equipments from time to time.

After second interval T$_2$, user equipments may transition to the clustering state 902 to form new groups. For example, as depicted in FIG. 9B, assuming the user equipments had moved about, two new groups 956 and 960 may be formed with two new group leader, 958 and 962, respectively. This new set of groups 953 may then persist for another interval T$_2$, and the process may generally carry on iteratively as described with respect to FIG. 9A.

Generally, there is a tradeoff between the number of user equipments in a group and the amount of energy saving in the group. For example, more user equipments in a group (e.g., group 952 compared to group 956) may generally reduce the energy cost of high-power operations, such as high-power communications and sensing. However, more user equipments in a group may also increase the intra-cluster overhead, the power burden on the leader, and the overall latency of the group. Accordingly, the number of user equipments in a group may be subject to a limit or target number, which may generally be configured as part of clustering state 902.

In some aspects, clustering may be performed using a method such as K-means, and the distances between user equipments may be measured by channel metrics (e.g., channel state information) between each user equipment. The following steps give an example of a K-means technique.

Step 0: initiate clustering (e.g., at clustering state 902) by having all user equipment broadcast their user equipment ID to other user equipments in an area so that all the user equipments in the area may measure channel conditions (e.g., RSSI) relative to each other.

Step 1: randomly select K user equipments as initial cluster centers.

Step 2: broadcast, from each of the K initial cluster center user equipments, a group ID. Upon receiving one or more (up to K) broadcast group IDs, each user equipment, other than the K initial group center user equipments, selects a cluster center user equipment with the highest RSSI (in this example) and replies with its node ID, which forms the initial cluster. Each cluster center user equipment may then broadcast a group member list to all members of its cluster.

Step 3: within each of the K clusters, select a user equipment with a highest sum of RSSIs based on its connection with other nodes in the group as the new cluster center user equipment. Note that this step differs from standard K-means in that the nearest mean is based on the channel quality measurement instead of the distance between the nodes.

Step 4: iterate between steps 2 and 3 until there is no change to the group center user equipments.

Note that the preceding example is one method of clustering user equipments using K-means, but other clustering methods may likewise be used.

Figure 10:
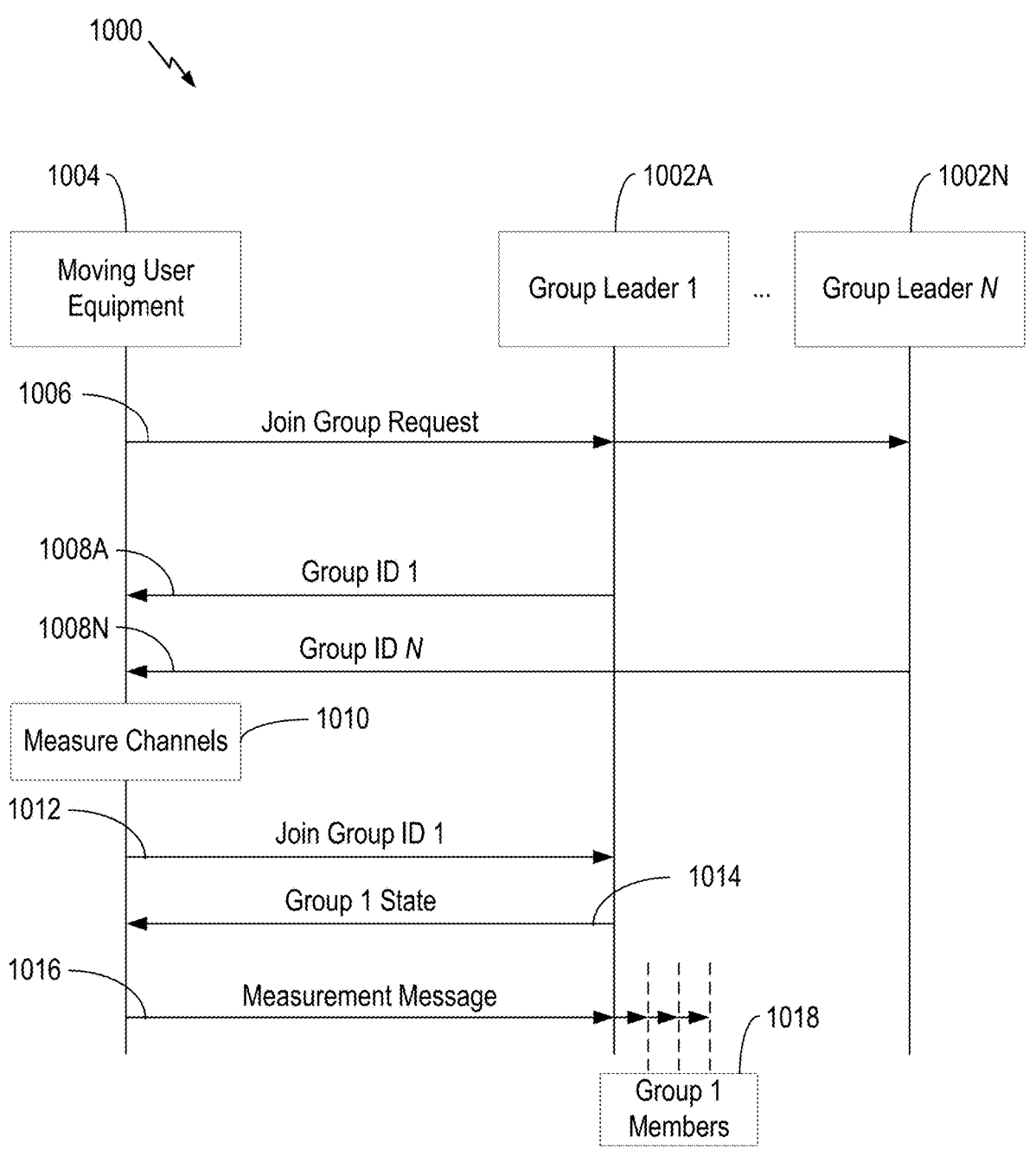
FIG. 10 depicts an example flow of a user equipment joining a group.

FIG. 10 depicts an example flow 1000 of a user equipment (e.g., a low-power user equipment) joining a group.

In some aspects, a user equipment may monitor a number of resource allocations over a period of time (e.g., 3 consecutive frames), and if it does not receive any resource allocations during that time, it determines to join a new group and identifies itself as leaving.

In example 1000, the moving user equipment 1004 and broadcasts a join group request message at step 1006. When doing so, in order to maximize its chances of finding nearby user equipment groups with which to join, it may set its transmit power to a maximum level for the given transceiver system used to transmit the message (e.g., a low-power transceiver system).

Group leaders 1002A-1002N then receive the join group message and each respective group leader responds with a respective group ID message at steps 1008A-N, which include a group ID value. For example, the group ID message could be a message 1 for a random access procedure, which may include a group ID value.

The moving user equipment 1004 then measures channels (e.g., measures a RSSI) between itself and all of the group leaders 1002-1002N from which it received a group ID message (1008A-1008N) at step 1010. Based on the channel measurements, the moving user equipment 1004 determines a group to join (e.g., based on the group leader having the highest RSSI) and sends a join group message (e.g., a message 2 for the random access procedure) at step 1012, which includes the group ID it is joining. In example 1000, the moving user equipment 1004 has decided to join Group 1 based on the channel state between group leader 1 (1002A) and the moving user equipment 1004 and thus sends the join group message at step 1012 to group leader 1 (1002A).

In response to receiving the join group message from the moving user equipment 1004, group leader 1 (1002A) sends a group 1 state message to the moving user equipment 1004 at step 1014, which may include information necessary for the moving user equipment 1004 to join group 1, such as the current group leader ID, a list of other user equipments (e.g., follower user equipments' IDs) in group 1, and the like. In some aspects, the group 1 state message may be a message 3 for the random access procedure.

Finally, at step 1016, the moving user equipment 1004 sends a measurement message to group leader 1002A as well as other group 1 members 1018 so that all group 1 members can measure channels (e.g., measures a RSSI) between themselves and the moving user equipment 1004. In some aspects, the measurement message may be a message 4 of a random access procedure.

Note that FIG. 10 depicts one process for a moving user equipment to move between (or to a new) group, but other processes are possible.

FIG. 11 depicts an example 1100 of a first order radio model for determining expected power costs for transmitting and receiving data (e.g., bits in a packet). Such a model may be used, for example, by a user equipment determining expected power for high-power communications (e.g., for NB-IoT communications) when determining a group leader, as discussed above with respect to FIG. 6.

For example, for a given number x of data bits (e.g., in a packet), the power budget (or cost) for performing a transmission may include a processing power budget and a transmitting power budget. In one aspect, the processing power budget is determined (or estimated) by $E_{tx\_elec}*x$, where $E_{tx\_elec}$ is the expected energy cost per bit for the transmit electronics and x is the total number of data bits. In one aspect, the transmitting power budget is determined (or estimated) by $(E_{tx\_amp}*(x+P))$, where $E_{tx\_amp}$ is the expected energy cost per bit for the transmit amplifier, x is the total number of data bits, and P is the number of protocol bits.

Similarly, a receiving power budget (or cost) may be determined (or estimated) by $(E_{tx\_elec}*(x+P))$, where $E_{tx\_elec}$ is the expected energy cost per bit for the receive electronics, x is the total number of data bits, and P is the number of protocol bits.

Example Operations of a User Equipment

Figure 12:
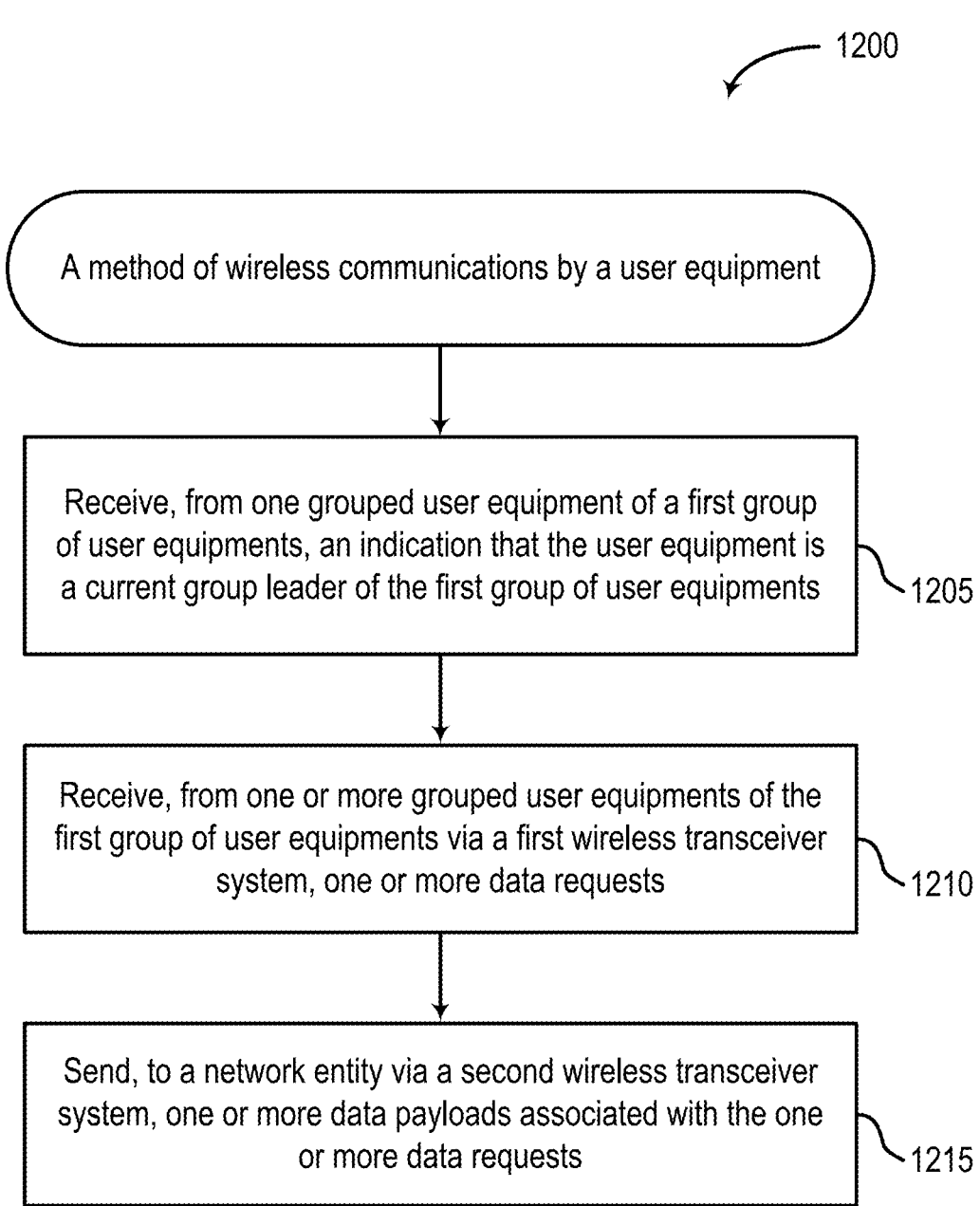
FIG. 12 depicts a method for wireless communications.

FIG. 12 shows an example of a method 1200 for wireless communications by a user equipment, such as UE 104 of FIGS. 1 and 3.

Method 1200 begins at step 1205 with receiving, from one grouped user equipment of a first group of user equipments, an indication that the user equipment is a current group leader of the first group of user equipments. In some cases, the operations of this step refer to, or may be performed by, circuitry for receiving and/or code for receiving as described with reference to FIG. 13.

Method 1200 then proceeds to step 1210 with receiving, from one or more grouped user equipments of the first group of user equipments via a first wireless transceiver system, one or more data requests. In some cases, the operations of this step refer to, or may be performed by, circuitry for receiving and/or code for receiving as described with reference to FIG. 13.

Method 1200 then proceeds to step 1215 with sending, to a network entity via a second wireless transceiver system, one or more data payloads associated with the one or more data requests. In some cases, the operations of this step refer to, or may be performed by, circuitry for sending and/or code for sending as described with reference to FIG. 13.

In some aspects, the method 1200 further includes performing, using an electronic system, a data task associated with at least one of the one or more data requests. In some cases, the operations of this step refer to, or may be performed by, circuitry for performing and/or code for performing as described with reference to FIG. 13.

In some aspects, the electronic system comprises a satellite positioning system, and the data task comprises determining a location of the user equipment using the satellite positioning system.

In some aspects, the electronic system comprises a sensor system, and the data task comprises determining a sensor value using the sensor system.

In some aspects, the first wireless transceiver system comprises a short-range wireless transceiver system, and the second wireless transceiver system comprises a long-range wireless transceiver system.

In some aspects, the first wireless transceiver system comprises a BLUETOOTH® transceiver system, and the second wireless transceiver system comprises a cellular transceiver system (e.g., a 3GPP cellular system, such as a 5G cellular system). In some aspects, the cellular transceiver system comprise one of: a NB-IoT transceiver system; a NR reduced capability transceiver system; a NR superlight transceiver system; or a NR superlight sidelink transceiver system.

In some aspects, at least one data request of the one or more data requests comprises a data payload to be sent to the network entity by the user equipment.

In some aspects, the method 1200 further includes receiving, from the first group of user equipments via the first wireless transceiver system, a plurality of leader election scores. In some cases, the operations of this step refer to, or may be performed by, circuitry for receiving and/or code for receiving as described with reference to FIG. 13.

In some aspects, the method 1200 further includes determining a leader election score for the user equipment. In some cases, the operations of this step refer to, or may be performed by, circuitry for determining and/or code for determining as described with reference to FIG. 13.

In some aspects, the method 1200 further includes determining a new group leader based on the leader election score for the user equipment and the received plurality of leader election scores. In some cases, the operations of this step refer to, or may be performed by, circuitry for determining and/or code for determining as described with reference to FIG. 13.

In some aspects, the method 1200 further includes sending, to the new group leader via the first wireless transceiver system, an indication that the new group leader is the new group leader. In some cases, the operations of this step refer to, or may be performed by, circuitry for sending and/or code for sending as described with reference to FIG. 13.

In some aspects, the leader election score for the user equipment is based on one or more of: a state of charge of a power storage device (e.g., a battery) in the user equipment; a channel state metric associated with a channel between the user equipment and the network entity; and a remaining target service life of the user equipment.

In some aspects, the method 1200 further includes determining that two highest leader election scores from the leader election score for the user equipment and the received plurality of leader election scores are a same value. In some cases, the operations of this step refer to, or may be performed by, circuitry for determining and/or code for determining as described with reference to FIG. 13.

In some aspects, the method 1200 further includes determining the new group leader based on a random selection between two user equipments associated with the two highest leader election scores. In some cases, the operations of this step refer to, or may be performed by, circuitry for determining and/or code for determining as described with reference to FIG. 13.

In some aspects, the method 1200 further includes updating an operational state of the user equipment. In some cases, the operations of this step refer to, or may be performed by, circuitry for updating and/or code for updating as described with reference to FIG. 13.

In some aspects, updating the operational state of the user equipment comprises: determining a state of charge of a power storage device in the user equipment; and comparing the state of charge of the power storage device to one or more thresholds to determine the operational state.

In some aspects, the method 1200 further includes disabling one or more of the first wireless transceiver system or the second wireless transceiver system based on the operational state, such as described with respect to FIG. 7. In some cases, the operations of this step refer to, or may be performed by, circuitry for disabling and/or code for disabling as described with reference to FIG. 13.

In some aspects, at least one of the one or more thresholds is based on an estimated amount of energy required for making a transmission using one of the first wireless transceiver system or the second wireless transceiver system.

In some aspects, the method 1200 further includes storing in a memory of the user equipment one or more of: an operational state of the user equipment; a group identifier; a group leader identifier; a list of all grouped user equipments in a group associated with the group identifier; a state of charge of a power storage device in the user equipment; a channel state metric associated with a channel between the user equipment and the network entity; and a remaining target service life of the user equipment. In some cases, the operations of this step refer to, or may be performed by, circuitry for storing and/or code for storing as described with reference to FIG. 13.

In some aspects, the method 1200 further includes joining a second group of user equipments. In some cases, the operations of this step refer to, or may be performed by, circuitry for joining and/or code for joining as described with reference to FIG. 13.

In some aspects, the method 1200 further includes determining to join the second group of user equipments based on a clustering procedure. In some cases, the operations of this step refer to, or may be performed by, circuitry for determining and/or code for determining as described with reference to FIG. 13.

In some aspects, the method 1200 further includes determining a group leader for the second group of user equipments based on a centroid of a cluster generated by the clustering procedure. In some cases, the operations of this step refer to, or may be performed by, circuitry for determining and/or code for determining as described with reference to FIG. 13.

In some aspects, the method 1200 further includes periodically monitoring for a broadcast group message. In some cases, the operations of this step refer to, or may be performed by, circuitry for monitoring and/or code for monitoring as described with reference to FIG. 13.

In some aspects, the method 1200 further includes joining the first group of user equipments based at least in part on receiving the broadcast group message. In some cases, the operations of this step refer to, or may be performed by, circuitry for joining and/or code for joining as described with reference to FIG. 13.

In some aspects, the broadcast group message comprises one or more of: a group identifier; a group leader identifier; and a list of all grouped user equipments in a group associated with the group identifier.

In some aspects, the user equipment comprises one of an IoT device, an always-on device, a sensor device, an edge processing device, or a tracking device.

In some aspects, the method 1200 further includes receiving, from the network entity via a second wireless transceiver system, one or more downlink data payloads. In some cases, the operations of this step refer to, or may be performed by, circuitry for joining and/or code for receiving as described with reference to FIG. 13.

In some aspects, the method 1200 further includes sending, to one or more grouped user equipments of the first group of user equipments via the first wireless transceiver system, one or more data responses based on the one or more downlink data payloads received from the network entity. In some cases, the operations of this step refer to, or may be performed by, circuitry for joining and/or code for sending as described with reference to FIG. 13.

In some aspects, at least one of the one or more downlink data payloads include an identifier configured to identify an intended recipient grouped user equipment of the first group of user equipments.

Figure 13:
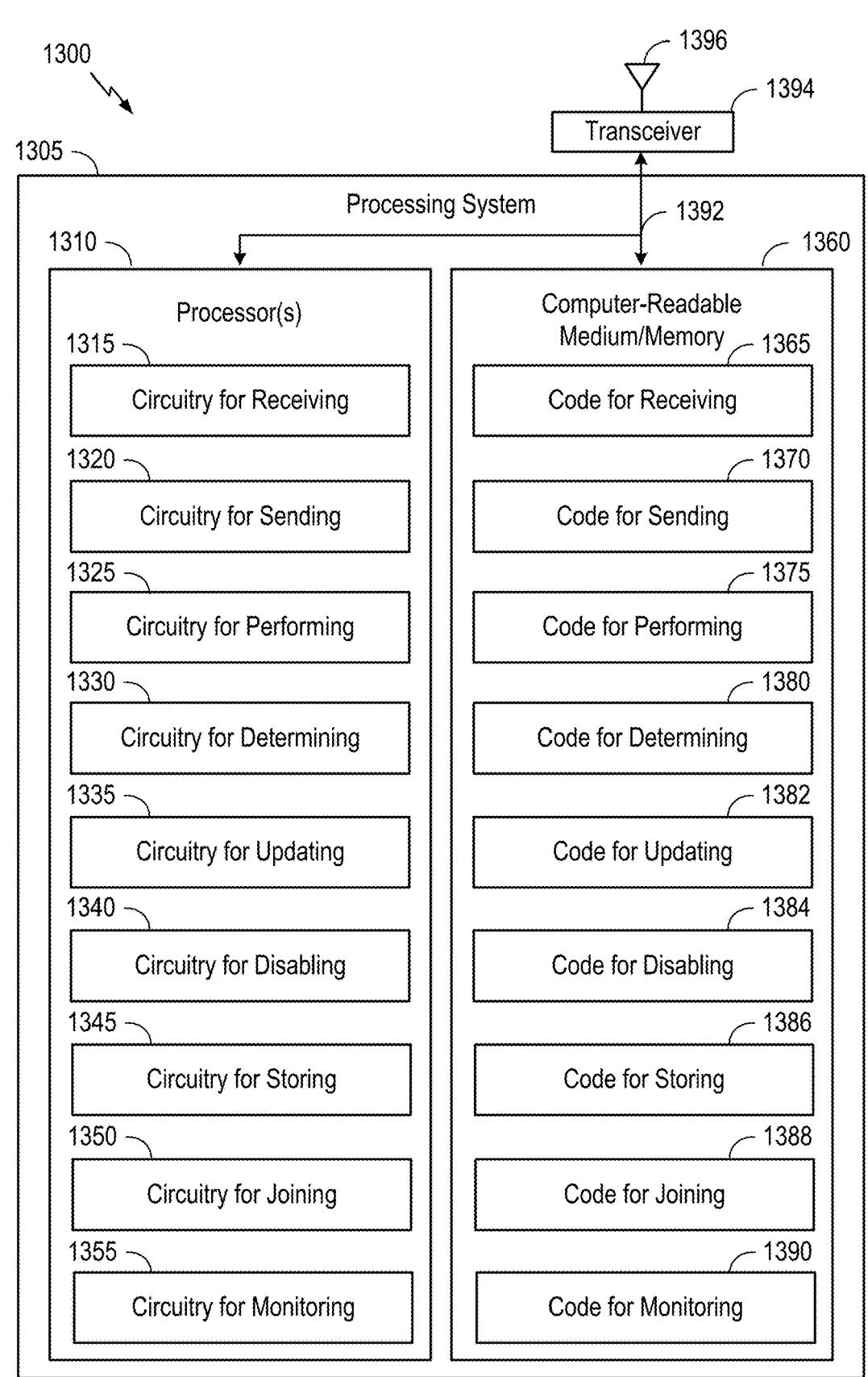
FIG. 13 depicts aspects of an example communications device.

In one aspect, method 1200, or any aspect related to it, may be performed by an apparatus, such as communications device 1300 of FIG. 13, which includes various components operable, configured, or adapted to perform the method 1200. Communications device 1300 is described below in further detail.

Note that FIG. 12 is just one example of a method, and other methods including fewer, additional, or alternative steps are possible consistent with this disclosure.

Example Communications Device

FIG. 13 depicts aspects of an example communications device 1300. In some aspects, communications device 1300 is a user equipment, such as UE 104 described above with respect to FIGS. 1 and 3. In some aspects, example communications device 1300 is a low-power device, such as an IoT device.

The communications device 1300 includes a processing system 1305 coupled to the transceiver 1394 (e.g., a transmitter and/or a receiver). The transceiver 1394 is configured to transmit and receive signals for the communications device 1300 via the antenna 1396, such as the various signals as described herein. The processing system 1305 may be configured to perform processing functions for the communications device 1300, including processing signals received and/or to be transmitted by the communications device 1300.

The processing system 1305 includes one or more processors 1310. In various aspects, the one or more processors 1310 may be representative of one or more of receive processor 358, transmit processor 364, TX MIMO processor 366, and/or controller/processor 380, as described with respect to FIG. 3. The one or more processors 1310 are coupled to a computer-readable medium/memory 1360 via a bus 1392. In certain aspects, the computer-readable medium/memory 1360 is configured to store instructions (e.g., computer-executable code) that when executed by the one or more processors 1310, cause the one or more processors 1310 to perform the method 1200 described with respect to FIG. 12, or any aspect related to it. Note that reference to a processor performing a function of communications device 1300 may include one or more processors 1310 performing that function of communications device 1300.

In the depicted example, computer-readable medium/memory 1360 stores code (e.g., executable instructions), such as code for receiving 1365, code for sending 1370, code for performing 1375, code for determining 1380, code for updating 1382, code for disabling 1384, code for storing 1386, code for joining 1388, and code for monitoring 1390. Processing of the code for receiving 1365, code for sending 1370, code for performing 1375, code for determining 1380, code for updating 1382, code for disabling 1384, code for storing 1386, code for joining 1388, and code for monitoring 1390 may cause the communications device 1300 to perform the method 1200 described with respect to FIG. 12, or any aspect related to it.

The one or more processors 1310 include circuitry configured to implement (e.g., execute) the code stored in the computer-readable medium/memory 1360, including circuitry such as circuitry for receiving 1315, circuitry for sending 1320, circuitry for performing 1325, circuitry for determining 1330, circuitry for updating 1335, circuitry for disabling 1340, circuitry for storing 1345, circuitry for joining 1350, and circuitry for monitoring 1355. Processing with circuitry for receiving 1315, circuitry for sending 1320, circuitry for performing 1325, circuitry for determining 1330, circuitry for updating 1335, circuitry for disabling 1340, circuitry for storing 1345, circuitry for joining 1350, and circuitry for monitoring 1355 may cause the communications device 1300 to perform the method 1200 described with respect to FIG. 12, or any aspect related to it.

Various components of the communications device 1300 may provide means for performing the method 1200 described with respect to FIG. 12, or any aspect related to it. For example, means for transmitting, sending or outputting for transmission may include transceivers 354 and/or antenna(s) 352 of the UE 104 illustrated in FIG. 3 and/or the transceiver 1394 and the antenna 1396 of the communications device 1300 in FIG. 13. Means for receiving or obtaining may include transceivers 354 and/or antenna(s) 352 of the UE 104 illustrated in FIG. 3 and/or the transceiver 1394 and the antenna 1396 of the communications device 1300 in FIG. 13.

Example Clauses

Implementation examples are described in the following numbered clauses:

Clause 1: A method of wireless communications by a user equipment, comprising: receiving, from one grouped user equipment of a first group of user equipments, an indication that the user equipment is a current group leader of the first group of user equipments; receiving, from one or more grouped user equipments of the first group of user equipments via a first wireless transceiver system, one or more data requests; and sending, to a network entity via a second wireless transceiver system, one or more data payloads associated with the one or more data requests.

Clause 2: The method of Clause 1, further comprising performing, using an electronic system, a data task associated with at least one of the one or more data requests.

Clause 3: The method of Clause 2, wherein: the electronic system comprises a satellite positioning system, and the data task comprises determining a location of the user equipment using the satellite positioning system.

Clause 4: The method of Clause 2, wherein: the electronic system comprises a sensor system, and the data task comprises determining a sensor value using the sensor system.

Clause 5: The method of any one of Clauses 1-4, wherein: the first wireless transceiver system comprises a short-range wireless transceiver system, and the second wireless transceiver system comprises a long-range wireless transceiver system.

Clause 6: The method of any one of Clauses 1-5, wherein: the first wireless transceiver system comprises a BLUETOOTH® transceiver system, and the second wireless transceiver system comprises a cellular transceiver system.

Clause 7: The method of Clause 6, wherein the cellular transceiver system comprise one of: a NB-IoT transceiver system; a NR reduced capability transceiver system; a NR superlight transceiver system; or a NR superlight sidelink transceiver system.

Clause 8: The method of any one of Clauses 1-7, wherein at least one data request of the one or more data requests comprises a data payload to be sent to the network entity by the user equipment.

Clause 9: The method of any one of Clauses 1-8, further comprising: receiving, from the first group of user equipments via the first wireless transceiver system, a plurality of leader election scores; determining a leader election score for the user equipment; determining a new group leader based on the leader election score for the user equipment and the received plurality of leader election scores; and sending, to the new group leader via the first wireless transceiver system, an indication that the new group leader is the new group leader.

Clause 10: The method of Clause 9, wherein the leader election score for the user equipment is based on one or more of: a state of charge of a power storage device in the user equipment; a channel state metric associated with a channel between the user equipment and the network entity; and a remaining target service life of the user equipment.

Clause 11: The method of Clause 9, further comprising: determining that two highest leader election scores from the leader election score for the user equipment and the received plurality of leader election scores are a same value; and determining the new group leader based on a random selection between two user equipments associated with the two highest leader election scores.

Clause 12: The method of any one of Clauses 1-11, further comprising updating an operational state of the user equipment.

Clause 13: The method of Clause 12, wherein updating the operational state of the user equipment comprises: determining a state of charge of a power storage device in the user equipment; and comparing the state of charge of the power storage device to one or more thresholds to determine the operational state.

Clause 14: The method of Clause 13, further comprising disabling one or more of the first wireless transceiver system or the second wireless transceiver system based on the operational state.

Clause 15: The method of Clause 13, wherein at least one of the one or more thresholds is based on an estimated amount of energy required for making a transmission using one of the first wireless transceiver system or the second wireless transceiver system.

Clause 16: The method of any one of Clauses 1-15, further comprising: storing in a memory of the user equipment one or more of: an operational state of the user equipment; a group identifier; a group leader identifier; a list of all grouped user equipments in a group associated with the group identifier; a state of charge of a power storage device in the user equipment; a channel state metric associated with a channel between the user equipment and the network entity; and a remaining target service life of the user equipment.

Clause 17: The method of any one of Clauses 1-16, further comprising joining a second group of user equipments.

Clause 18: The method of Clause 17, further comprising determining to join the second group of user equipments based on a clustering procedure.

Clause 19: The method of Clause 18, further comprising determining a group leader for the second group of user equipments based on a centroid of a cluster generated by the clustering procedure.

Clause 20: The method of any one of Clauses 1-19, further comprising: periodically monitoring for a broadcast group message; and joining the first group of user equipments based at least in part on receiving the broadcast group message.

Clause 21: The method of Clause 20, wherein the broadcast group message comprises one or more of: a group identifier; a group leader identifier; and a list of all grouped user equipments in a group associated with the group identifier.

Clause 22: The method of any one of Clauses 1-21, wherein the user equipment comprises an IoT device.

Clause 23: The method of any one of Clauses 1-22, further comprising receiving, from the network entity via a second wireless transceiver system, one or more downlink data payloads.

Clause 24: The method of Clause 23, further comprising sending, to one or more grouped user equipments of the first group of user equipments via the first wireless transceiver system, one or more data responses based on the one or more downlink data payloads received from the network entity.

Clause 25: The method of any one of Clauses 23-24, wherein at least one of the one or more downlink data payloads include an identifier configured to identify an intended recipient grouped user equipment of the first group of user equipments.

Clause 26: An apparatus, comprising: a memory comprising executable instructions; and a processor configured to execute the executable instructions and cause the apparatus to perform a method in accordance with any one of Clauses 1-25.

Clause 27: An apparatus, comprising means for performing a method in accordance with any one of Clauses 1-25.

Clause 28: A non-transitory computer-readable medium comprising executable instructions that, when executed by a processor of an apparatus, cause the apparatus to perform a method in accordance with any one of Clauses 1-25.

Clause 29: A computer program product embodied on a computer-readable storage medium comprising code for performing a method in accordance with any one of Clauses 1-25.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE), comprising:

at least one memory; and one or more processors, coupled to the at least one memory, configured to cause the UE to:

receive, from one grouped UE of a first group of UEs, an indication that the UE is a current group leader of the first group of UEs;

receive, from one or more grouped UEs of the first group of UEs via a first wireless transceiver system, one or more data requests; and send, to a network entity via a second wireless transceiver system, one or more data payloads associated with the one or more data requests;

receive, from the first group of UEs via the first wireless transceiver system, a plurality of leader selection scores, wherein each leader selection score of the plurality of leader selection scores is based, at least in part, on a state of charge of a battery of a respective UE of the first group of UEs and a target service life of the respective UE;

determine a new group leader based, at least in part, on the new group leader having a highest leader selection score among the received plurality of leader selection scores of the first group of UEs, wherein the highest leader selection score is based on the new group leader having a lowest remaining target service life among the first group of UEs; and send, to the new group leader via the first wireless transceiver system, an indication that the new group leader is the new group leader.

2. The UE of claim 1, wherein the one or more processors are further configured to cause the UE to perform, using an electronic system, a data task associated with at least one of the one or more data requests.

3. The UE of claim 2, wherein:

the electronic system comprises a satellite positioning system, and in order to perform the data task, the one or more processors are configured to cause the UE to determine a location of the UE using the satellite positioning system.

4. The UE of claim 2, wherein:

the electronic system comprises a sensor system, and in order to perform the data task, the one or more processors are configured to cause the UE to determine a sensor value using the sensor system.

5. The UE of claim 1, wherein:

the first wireless transceiver system comprises a short-range wireless transceiver system, and the second wireless transceiver system comprises a long-range wireless transceiver system.

6. The UE of claim 1, wherein:

the first wireless transceiver system comprises a BLUETOOTH® transceiver system, and the second wireless transceiver system comprises a cellular transceiver system.

7. The UE of claim 6, wherein the cellular transceiver system comprise one of:

a narrowband internet of things (NB-IOT) transceiver system;

a new radio (NR) reduced capability transceiver system;

a NR superlight transceiver system; or a NR superlight sidelink transceiver system.

8. The UE of claim 1, wherein at least one data request of the one or more data requests comprises a data payload to be sent to the network entity by the UE.

9. The UE of claim 1, wherein the one or more processors are further configured to cause the UE to:

determine a leader selection score for the UE; and determine the new group leader further based on the leader selection score for the UE.

10. The UE of claim 9, wherein the leader selection score for the UE is based on one or more of:

a state of charge of a power storage device in the UE;

a channel state metric associated with a channel between the UE and the network entity; and a remaining target service life of the UE.

11. The UE of claim 9, wherein the one or more processors are further configured to cause the UE to:

determine that two highest leader selection scores from the leader selection score for the UE and the received plurality of leader selection scores are a same value; and determine the new group leader based on a random selection between two UEs associated with the two highest leader selection scores.

12. The UE of claim 1, wherein the one or more processors are further configured to cause the UE to update an operational state of the UE.

13. The UE of claim 12, wherein, in order to update the operational state of the UE, the one or more processors are configured to cause the UE to:

determine a state of charge of a power storage device in the UE; and compare the state of charge of the power storage device to one or more thresholds to determine the operational state.

14. The UE of claim 13, wherein the one or more processors are further configured to cause the UE to disable one or more of the first wireless transceiver system or the second wireless transceiver system based on the operational state.

15. The UE of claim 13, wherein at least one of the one or more thresholds is based on an estimated amount of energy required for making a transmission using one of the first wireless transceiver system or the second wireless transceiver system.

16. The UE of claim 1, wherein the one or more processors are further configured to cause the UE to store, in the at least one memory of the UE, one or more of:

an operational state of the UE;

a group identifier;

a group leader identifier;

a list of all grouped UEs in a group associated with the group identifier;

a state of charge of a power storage device in the UE;

a channel state metric associated with a channel between the UE and the network entity; and a remaining target service life of the UE.

17. The UE of claim 1, wherein the one or more processors are further configured to cause the UE to join a second group of UEs.

18. The UE of claim 17, wherein the one or more processors are further configured to cause the UE to determine to join the second group of UEs based on a clustering procedure.

19. The UE of claim 18, wherein the one or more processors are further configured to cause the UE to determine a group leader for the second group of UEs based on a centroid of a cluster generated by the clustering procedure.

20. The UE of claim 1, wherein the one or more processors are further configured to cause the UE to:

periodically monitor for a broadcast group message; and join the first group of UEs based at least in part on receiving the broadcast group message.

21. The UE of claim 20, wherein the broadcast group message comprises one or more of:

a group identifier;

a group leader identifier; and a list of all grouped UEs in a group associated with the group identifier.

22. The UE of claim 1, wherein the UE comprises an internet of things (IOT) device.

23. The UE of claim 1, wherein the one or more processors are further configured to cause the UE to receive, from the network entity via a second wireless transceiver system, one or more downlink data payloads.

24. The UE of claim 23, wherein the one or more processors are further configured to cause the UE to send, to one or more grouped UEs of the first group of UEs via the first wireless transceiver system, one or more data responses based on the one or more downlink data payloads received from the network entity.

25. The UE of claim 23, wherein at least one of the one or more downlink data payloads include an identifier configured to identify an intended recipient grouped UE of the first group of UEs.

26. A method for wireless communication by a user equipment (UE), comprising:

receiving, from one grouped UE of a first group of UEs, an indication that the UE is a current group leader of the first group of UEs;

receiving, from one or more grouped UEs of the first group of UEs via a first wireless transceiver system, one or more data requests; and sending, to a network entity via a second wireless transceiver system, one or more data payloads associated with the one or more data requests;

receiving, from the first group of UEs via the first wireless transceiver system, a plurality of leader selection scores, wherein each leader selection score of the plurality of leader selection scores is based, at least in part, on a state of charge of a battery of a respective UE of the first group of UEs and a target service life of the respective UE;

determining a new group leader based, at least in part, on the new group leader having a highest leader selection score among the received plurality of leader selection scores of the first group of UEs, wherein the highest leader selection score is based on the new group leader having a lowest remaining target service life among the first group of UEs; and sending, to the new group leader via the first wireless transceiver system, an indication that the new group leader is the new group leader.

27. A non-transitory computer-readable medium comprising computer- executable instructions that, when executed by one or more processors of a user equipment, cause the user equipment to perform a method of wireless communications, comprising:

receiving, from one grouped UE of a first group of UEs, an indication that the UE is a current group leader of the first group of UEs;

receiving, from one or more grouped UEs of the first group of UEs via a first wireless transceiver system, one or more data requests; and sending, to a network entity via a second wireless transceiver system, one or more data payloads associated with the one or more data requests;

receiving, from the first group of UEs via the first wireless transceiver system, a plurality of leader selection scores, wherein each leader selection score of the plurality of leader selection scores is based, at least in part, on a state of charge of a battery of a respective UE of the first group of UEs and a target service life of the respective UE;

determining a new group leader based, at least in part, on the new group leader having a highest leader selection score among the received plurality of leader selection scores of the first group of UEs, wherein the highest leader selection score is based on the new group leader having a lowest remaining target service life among the first group of UEs; and sending, to the new group leader via the first wireless transceiver system, an indication that the new group leader is the new group leader.

*     *     *     *     *